(12) United States Patent
Power (10) Patent No.: US 9,110,239 B2
(45) Date of Patent: Aug. 18, 2015

(54) DIFFRACTIVE DEVICE

(71) Applicant: INNOVIA SECURITY PTY LTD, Craigieburn, Victoria (AU)

(72) Inventor: Gary Fairless Power, Craigieburn (AU)

(73) Assignee: INNOVIA SECURITY PTY LTD, Craigieburn, Victoria (AU)

( * ) Notice: Subject to any disclaimer, the term of this patent is extended or adjusted under 35 U.S.C. 154(b) by 0 days.

(21) Appl. No.: 14/360,780

(22) PCT Filed: Nov. 28, 2012

(86) PCT No.: PCT/AU2012/001455
§ 371 (c)(1),
(2) Date: May 27, 2014

(87) PCT Pub. No.: WO2013/078503
PCT Pub. Date: Jun. 6, 2013

(65) Prior Publication Data
US 2014/0293423 A1 Oct. 2, 2014

(30) Foreign Application Priority Data
Nov. 30, 2011 (AU) .................................. 2011101567

(51) Int. Cl.
*G02B 5/18* (2006.01)
*G02B 27/42* (2006.01)
(Continued)

(52) U.S. Cl.
CPC ................. *G02B 5/18* (2013.01); *G03H 1/0011* (2013.01); *G03H 1/0244* (2013.01);
(Continued)

(58) Field of Classification Search
CPC . G03H 1/0011; G03H 1/0244; G03H 1/2249; G02B 5/18; G07D 7/12; G07D 7/121; G07D 7/2066
USPC ............... 359/558, 1, 217.4, 290, 568, 2, 20; 250/488.1, 487.1
See application file for complete search history.

(56) References Cited

U.S. PATENT DOCUMENTS

2004/0223156 A1    11/2004  McGrew et al.
2004/0239099 A1*  12/2004  Tompkin et al. ................. 283/74
(Continued)

OTHER PUBLICATIONS

International Searching Authority (ISA), International Search Report (ISR) and Written Opinion (WO) for International Application No. PCT/AU2012/001455, Mar. 28, 2013, 12 pages, Korean Intellectual Property Office, Republic of Korea.

(Continued)

*Primary Examiner* — Ricky Mack
*Assistant Examiner* — Mustak Choudhury
(74) *Attorney, Agent, or Firm* — Alston & Bird LLP (57) ABSTRACT

A method and apparatus for viewing or authenticating a diffractive device and a diffractive security device (1) are provided in which a first diffractive relief structure (200) is responsive to a first wavelength of visible monochromatic light, a second diffractive relief structure (200) is at least partially interlaced with the first diffractive relief structure (100) and responsive to a second wavelength of visible monochromatic light, and a third diffractive relief structure (400) is at least partially interlaced with the first and second diffractive relief structures (100, 200) and responsive to a third wavelength of visible monochromatic light. Under illumination by the first, second and third wavelengths of monochromatic light, the first diffractive relief structure (200) produces a first partial image of a first color in a reconstruction plane, the second diffractive relief structure (300) produces a second partial image of a second color in the reconstruction plane and the third diffractive relief structure (400) produces a third partial image of a third color in the reconstruction plane, and the first, second and third partial images at least partially overlap in the reconstruction plane to form a multicolored image. The diffractive security device may be used in a security document and the device may be authenticated by comparing the multicolored image to a reference image.

19 Claims, 4 Drawing Sheets

(51) Int. Cl.
*G07D 7/12* (2006.01)
*G07D 7/20* (2006.01)
*G03H 1/00* (2006.01)
*G03H 1/02* (2006.01)
*G03H 1/22* (2006.01)
G03H 1/26 (2006.01)
G03H 1/30 (2006.01)

(52) U.S. Cl.
CPC .............. *G03H 1/2249* (2013.01); *G07D 7/12* (2013.01); *G07D 7/121* (2013.01); *G07D 7/2066* (2013.01); *G03H 1/2286* (2013.01); G03H 2001/2263 (2013.01); G03H 2001/266 (2013.01); G03H 2001/303 (2013.01); G03H 2210/20 (2013.01); G03H 2222/13 (2013.01)

(56) References Cited

U.S. PATENT DOCUMENTS

| | | |
|---|---|---|
| 2005/0219668 A1 | 10/2005 | Taghizadeh |
| 2006/0222960 A1* | 10/2006 | Ueda et al. .................. 430/1 |
| 2008/0273568 A1 | 11/2008 | Schulz et al. |
| 2009/0072526 A1 | 3/2009 | Peters et al. |
| 2009/0153926 A1* | 6/2009 | Wiltshire et al. ................ 359/2 |
| 2010/0195174 A1 | 8/2010 | Nemeth et al. |

OTHER PUBLICATIONS

International Preliminary Examining Authority, International Preliminary Report on Patentability, including Applicant's Sep. 25, 2013 Response to the ISA's Mar. 28, 2013 ISR and WO for International Application No. PCT/AU2012/001455, Mar. 18, 2014, 28 pages, Korean Intellectual Property Office, Republic of Korea.

* cited by examiner

DIFFRACTIVE DEVICE

CROSS REFERENCE TO RELATED APPLICATIONS

This application is a national stage application, filed under 35 U.S.C. §371, of International Application No. PCT/AU2012/001455, filed Nov. 28, 2012, which claims priority to Australian Patent Application No. 2011101567, filed Nov. 30, 2011, the contents of both which are hereby incorporated by reference in their entirety.

BACKGROUND

1. Related Field

The present invention relates to diffractive devices, and methods for their inspection and manufacture. The invention may be applied in securing bank notes and the like against counterfeiting. It will also be appreciated that the invention may be applied in other contexts.

Diffractive Optical Elements (DOEs): As used herein, the term diffractive optical element refers to a numerical-type diffractive optical element (DOE). Numerical-type diffractive optical elements (DOEs) rely on the mapping of complex data that reconstruct in the far field (or reconstruction plane) a two-dimensional intensity pattern. Thus, when substantially collimated light, e.g. from a point light source or a laser, is incident upon the DOE, an interference pattern is generated that produces a projected image in the reconstruction plane that is visible when a suitable viewing surface is located in the reconstruction plane, or when the DOE is viewed in transmission at the reconstruction plane. The transformation between the two planes can be approximated by a Fast Fourier Transform (FFT). Thus, complex data including amplitude and phase information has to be physically encoded in the microstructure of the DOE. This DOE data can be calculated by performing an inverse FFT transformation of the desired reconstruction (i.e. the desired intensity pattern in the far field).

DOEs are sometimes referred to as computer-generated holograms, but they differ from other types of holograms, such as rainbow holograms, Fresnel holograms and volume reflection holograms.

Security document: As used herein, the term security document includes all types of documents and tokens of value and identification documents including, but not limited to the following: items of currency such as banknotes and coins, credit cards, cheques, passports, identity cards, securities and share certificates, driver's licences, deeds of title, travel documents such as airline and train tickets, entrance cards and tickets, birth, death and marriage certificates, and academic transcripts.

Transparent Windows and Half Windows: As used herein the term window refers to a transparent or translucent area in the security document compared to the substantially opaque region to which printing is applied. The window may be fully transparent so that it allows the transmission of light substantially unaffected, or it may be partly transparent or translucent partially allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting at least one opacifying layer in the region forming the window area. If opacifying layers are applied to both sides of a transparent substrate a fully transparent window may be formed by omitting the opacifying layers on both sides of the transparent substrate in the window area.

A partly transparent or translucent area, hereinafter referred to as a "half-window", may be formed in a polymeric security document which has opacifying layers on both sides by omitting the opacifying layers on one side only of the security document in the window area so that the "half-window" is not fully transparent, but allows some light to pass through without allowing objects to be viewed clearly through the half-window.

Alternatively, it is possible for the substrates to be formed from a substantially opaque material, such as paper or fibrous material, with an insert of transparent plastics material inserted into a cut-out, or recess in the paper or fibrous substrate to form a transparent window or a translucent half-window area.

Opacifying layers: One or more opacifying layers may be applied to a transparent substrate to increase the opacity of the security document. An opacifying layer is such that $L_T < L_o$, where $L_o$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

2. Description of Related Art

The use of diffractive optical elements (DOEs) in various settings to produce a desired output beam from a monochromatic or polychromatic source is known. For example, DOEs are used as beam-shaping or power redistribution elements for lasers.

It is also known to use DOEs as security features in security documents, for example in polymer banknotes issued in Brunei and Vietnam and marketed under the trade mark WinDOE. Typically, such security features are verified by illuminating the DOE with a point source or a pseudo-point source of polychromatic or monochromatic light. The reconstructed beam is observed in reflection or transmission as a simple image such as a character or set of numerals.

Whilst DOEs in security documents have been successful as security features, it has to date only been possible to produce DOE's which project monochromatic images, or chromatically aberrated polychromatic images in which the colors are separated due to the angular separation between diffraction orders for a given wavelength.

It would be desirable, in view of the above, to provide a diffractive device capable of producing more sophisticated colored imagery.

BRIEF SUMMARY

According to a first aspect of the invention there is provided a method of viewing or authenticating a diffractive device including a first diffractive relief structure responsive to a first wavelength of visible monochromatic light, a second diffractive relief structure at least partially interlaced with the first diffractive relief structure and responsive to a second wavelength of visible monochromatic light, and a third diffractive relief structure at least partially interlaced with the first and second diffractive relief structures and responsive to a third wavelength of visible monochromatic light, wherein the method includes the steps of: illuminating the diffractive device with a first beam of visible monochromatic light of the first wavelength to produce a first partial image of a first color in a reconstruction plane, illuminating the diffractive device with a second beam of visible monochromatic light of the second wavelength to produce a second partial image of a second color in the reconstruction plane, and illuminating the diffractive device with a third beam of monochromatic light of the third wavelength to produce a third partial image of a third color in a reconstruction plane, whereby the first, second and third partial images at least partially overlap in the reconstruction plane to form a multicolored image.

Preferably, the method includes comparing the multicolored image to a reference image to authenticate the diffractive device.

In the method above the illumination steps may be performed substantially simultaneously, but are preferably performed in sequence, and more preferably in a cyclical manner. The frequency of the cyclical illumination is preferably such that the three colors of the partially overlapping partial images produce the effect of a multicolored image through eye residual image retention when viewed directly by the human eye, even though each illumination by a single wavelength produces only a single color in the reconstruction plane. The illuminations are preferably performed at a frequency which is greater than the image retention time of the human vision system. The frequency is preferably at least 12 Hz, and more preferably about 24 Hz. The first, second and third colors of the partial images may correspond to three colors of a multicolored input image. Preferably, the three colors are primary or secondary colors. The multicolored image may be formed by additive colors or the colors may be projected such that they fall in a separate projection space to create the range of colors in the multicolored image by half toning.

According to another aspect of the invention, there is provided a diffractive security device, including a transparent substrate, a first diffractive relief structure provided in or on the transparent substrate and responsive to a first wavelength of visible light, a second diffractive relief structure at least partially interlaced with the first relief structure in or on the transparent substrate and responsive to a second wavelength of visible light, a third diffractive relief structure at least partially interlaced with the first and second relief structures in or on the transparent substrate and responsive to a third wavelength of visible light, wherein, under illumination, the first diffractive relief structure produces a first partial image of a first color in a reconstruction plane, the second diffractive relief structure produces a second partial image of a second color in the reconstruction plane and the third diffractive relief structure produces a third partial image of a third color in the reconstruction plane, and the first, second and third partial images at least partially overlap in the reconstruction plane to form a multicolored image.

Preferably, each of the first, second and third diffractive relief structures is a numerical-type diffractive optical element (DOE).

Preferably, the first, second and third diffractive relief structures are responsive to wavelengths of primary or secondary colors.

The first, second and third relief structures of the diffractive security device may be modulated to produce variations in intensity in the reconstruction plane which correspond to variations in brightness levels of a tonal colored input image. This may be achieved by modulating the heights or depths of the first, second and third relief structures to produce the variations in intensity.

The diffractive security device may include further relief structures responsive to the first, second and third wavelengths, the further relief structures producing further partial images in at least one additional reconstruction plane, the further partial images at least partially overlapping to produce a further multicolored image in the at least one additional reconstruction plane. Each relief structure may be designed such that more than 50% of the intensity distribution of light diffracted from the relief structure resides in the first positive diffractive order.

In a particularly preferred embodiment, each relief structure includes a plurality of diffractive segments, the diffractive segments being interlaced with diffractive segments of the other relief structures. Preferably, the largest dimension of each segment is less than 20 microns (mm). Each segment preferably corresponds to a pixel or a group of pixels from a multicolored input image.

According to a further aspect of the invention there is provided a security device including a diffractive structure as described in the above embodiments.

The security device may be a transmissive security device adapted to be viewed in transmission.

In other embodiments, the security device may include a reflective layer of a metallic or high-refractive index material or the reflective layer may be applied to the relief structure to produce a substantially planar surface.

Other aspects of the invention are directed to a security document, such as a banknote including the security devices, as described above. Preferably, the security device is applied on or in a window or half-window region of the security document.

According to a further aspect of the invention, there is provided apparatus for viewing or authenticating a diffractive device including a first diffractive relief structure responsive to a first wavelength of visible monochromatic light, a second diffractive relief structure at least partially interlaced with the first relief structure and responsive to a second wavelength of visible monochromatic light and a third diffractive relief structure responsive to a third wavelength of visible monochromatic light and at least partially interlaced with the first and second diffractive relief structures, wherein the apparatus includes illumination means for producing three separate beams of visible monochromatic light of the first, second and third wavelengths, wherein the first beam of visible monochromatic light of the first wavelength is directed onto the diffractive device to produce a first partial image of a first color in a reconstruction plane, the second beam of visible monochromatic light of the second wavelength is directed onto the diffractive device to produce a second partial image of a second color in a reconstruction plane, and a third beam of visible monochromatic light of the third wavelength is directed onto the diffractive device to produce a third partial image of a third color in a reconstruction plane, whereby the first, second and third partial images at least partially overlap in the reconstruction plane to form a multicolored image.

Preferably, the apparatus includes comparison means for comparing the multicolored image to a reference image to authenticate the diffractive device.

Preferably, the first, second and third colors of the partial images correspond to three colors of a multicolored input image. The three colors are preferably primary colors, such as red, green and blue, but may be secondary colors, such as cyan, magenta and yellow. The complete multicolored image may be formed by additive colors. Alternatively, the colors may also be projected such that they fall in a separate projection space to create the range of colors in the multicolored image by half toning.

Preferably, the illumination means includes: three different sources of visible monochromatic light of each of the first, second and third wavelengths; or a single source of polychromatic light and a plurality of optical filter elements arranged to produce three separate beams of monochromatic light of the first, second and third wavelengths when illuminated by the polychromatic light source.

When the diffractive device is a diffractive optical element or DOE as defined herein, each separate light source is preferably a point light source or a pseudo point light source, such as a light emitting diode (LED) or organic light emitting diode (OLED), although collimated light sources, such as lasers may also be used.

The apparatus may include switching means for switching between the first, second and third wavelengths, preferably in sequence or in a cyclical manner. When separate light sources of different colors are provided, the switching means may be arranged to switch the light sources on and off in sequence or cyclically.

In an alternative embodiment, the illumination means may comprise a polychromatic light source in combination with suitable optical filters for producing the first, second and third wavelengths. In this embodiment, the switching means may include a rotatable filter wheel.

The apparatus may further include a screen or detector positioned at or near the reconstruction plane.

BRIEF DESCRIPTION OF THE FIGURES

Preferred embodiments of the present invention will now be described, by way of example only, with reference to the accompanying drawings in which.

DETAILED DESCRIPTION OF VARIOUS EMBODIMENTS

Figure 1:
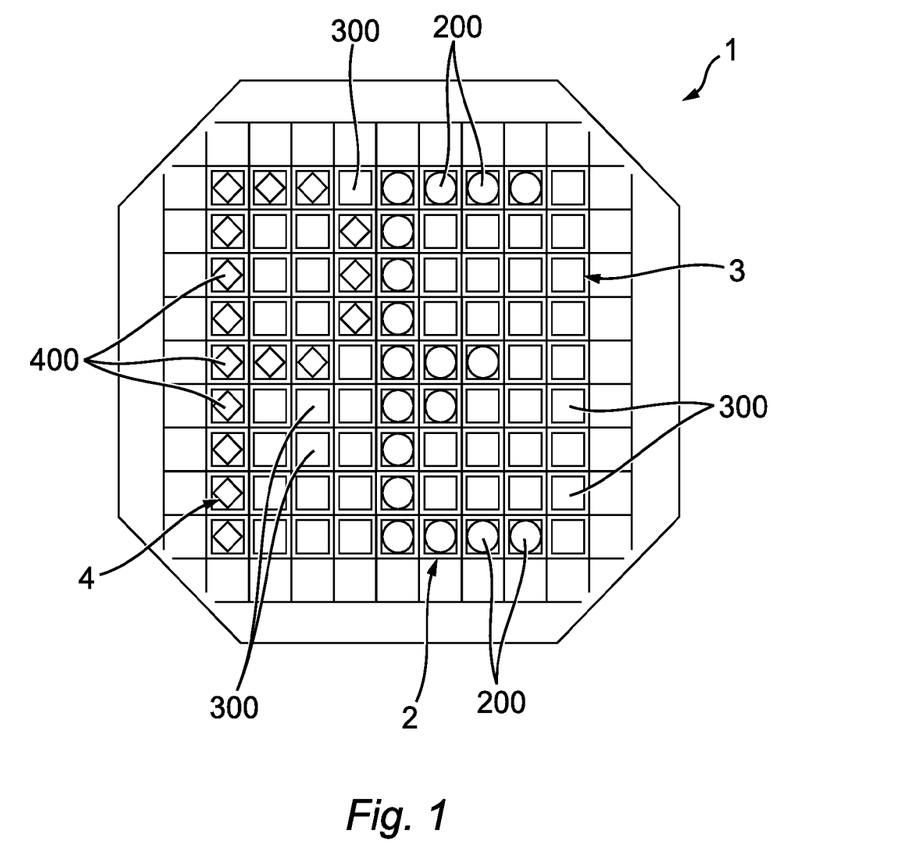
FIG. 1 is a schematic plan view of a diffractive device in accordance with the invention.

FIG. 1 schematically shows a diffractive device 1 having a plurality of diffractive relief structures 2, 3 and 4, each responsive to a different wavelength of light in the visible spectrum. In the embodiment shown, each diffractive relief structure 2, 3, 4 includes a plurality of diffractive segments or pixels 200, 300 and 400, each corresponding to a pixel or group of pixels from a multicolored input image.

By way of example, a first group of diffractive segments or pixels 200 of the first diffractive relief structure 2 may be responsive to light of a red color, a second group of diffractive segments of pixels 300 of the second diffractive structure 3 may be responsible to light of a green color, and the third group of diffractive segments or pixels 400 of the third diffractive relief structure 4 may be responsive to the light of a blue color.

The diffractive segments or pixels 200, 300, 400 of the first, second and third diffractive relief structures 2, 3 and 4 are at least partially interlaced. For example, as shown in FIG. 1 the second group of diffractive segments or pixels 300 (represented by squares) are interlaced with the first group of diffractive segments or pixels 200 (represented by circles). As shown, the second group 300 is arranged to form a background for the first group 200 which are arranged in the shape of a letter 'E'.

The third group of diffractive segments or pixels 400 (represented by diamonds in FIG. 1) are also interlaced with the second group 300. Again the second group 300 may be arranged to form a background for the third group 400, in this case arranged in the shape of a letter 'P' as shown in FIG. 1.

Although the first and third groups of diffractive segments or pixels 200, 400 are not shown as interlaced in FIG. 1, in particularly preferred embodiments, all three groups 200, 300 and 400 will be interlaced with each other.

The diffractive device 1 comprising the first, second and third diffractive relief structures 2, 3 and 4 is preferably a numerical-type diffractive optical element or DOE as defined herein. Such a DOE is arranged to generate an interference pattern that produces a projected image in a reconstruction plane when illuminated by a point light source (or pseudo point light source) or another source of substantially collimated light, such as a laser.

The optical effect produced when the diffractive device of FIG. 1 is illuminated with a polychromatic point source of light is a multicolored image in the reconstruction plane with severe chromatic distortion and blurring. The diffractive device is, however, designed to be illuminated by first, second and third wavelengths of monochromatic visible light of the three different colors to which the first, second and third groups of diffractive segments or pixels 200, 300, 400 of the diffractive relief structures are responsive. Thus, in the particular embodiment of FIG. 1, when the diffractive device is illuminated with substantially collimated light of a red wavelength, the first group of diffractive segments or pixels 200 will produce a first partial image in red in the reconstruction plane, when illuminated with substantially collimated light of a green wavelength the second group of diffractive segments or pixels 300 will produce a second partial image in green in the reconstruction plane, and when illuminated with substantially collimated light of a blue wavelength, the third group of diffractive segments or pixels 400 will produce a third partial image in blue in the reconstruction plane.

Further, because the groups 200, 300 and 400 of diffractive segments or pixels are at least partially interlaced, when they are illuminated substantially simultaneously, sequentially or cyclically with each of the three wavelengths of the three different colors, the three partial images generated by the different groups 200, 300 and 400 overlap to produce a multicolored image in the reconstruction plane which is sharper and less blurred than the image produced by a polychromatic point light source and which does not suffer from severe chromatic aberration.

The diffractive segments or pixels 200, 300, 400 are conveniently substantially square in shape, although other shapes such as circles, triangles, hexagons and other polygons may be used. The minimum size of the pixels is preferably about 1 micron (mm) by 1 micron (mm). The maximum size of the pixels is preferably about 10 micron (mm) by 10 micron (mm). It is possible that the largest dimension of a pixel may exceed 10 micron (mm), and be as large as about 20 micron (mm), but larger dimensions than about 10 micron (mm) can result in less definition of the resulting multicolored image when the diffractive device is illuminated.

Referring to FIGS. 2 to 5, there are shown different ways of incorporating a diffractive device of the invention, such as described with reference to FIG. 1, into a security document, and also different methods and apparatus for viewing the resulting multicolored images.

Figure 2:
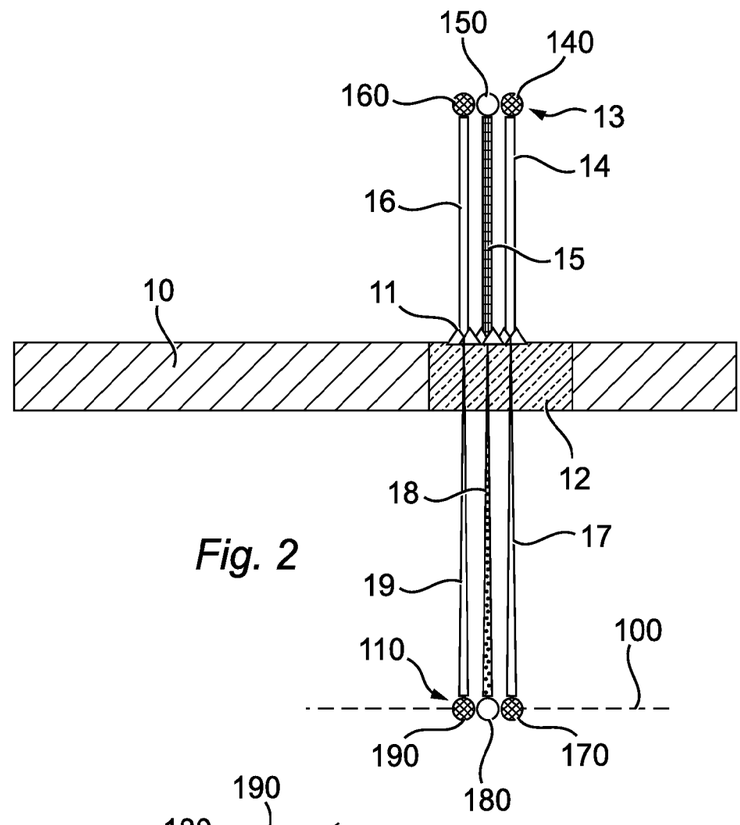
FIG. 2 is a schematic sectional view through a security document incorporating a transmissive diffractive security device in accordance with the invention and showing a method of viewing and authenticating the security device.

FIG. 2 shows a schematic sectional view of a security document 10 which includes a transmissive diffractive device 11 in the form of a numerical type diffractive optical element or DOE (as defined above) disposed in a substantially transparent area or window 12 of the document.

The apparatus for viewing the diffractive device 11 in FIG. 2 includes illumination means 13 arranged to produce three beams 14, 15 and 16 of substantially collimated, monochromatic light of three different wavelengths in the visible spectrum, for example, the red, green and blue parts of the spectrum. The illumination means 13 may, for example, comprise light emitting diodes (LEDs) 140, 150 and 160 of three different colors, e.g. red, green and blue. Alternatively, three different monochromatic light sources in the form of lasers of appropriate frequencies in the red, green and blue parts of the visible spectrum may be used instead of the LEDs 140, 150, 160.

The optical effect produced when the diffractive optical device 11 is illuminated by the illumination means 13 is shown schematically in the lower part of FIG. 2.

The substantially collimated light 14 from the red light source 140 will be transformed by the groups of diffractive segments or pixels 200 of the first diffractive relief structure 20 responsive to red light into a first patterned beam 17 of red light. This produces a first partial image 170 in red in a reconstruction plane 100. Similarly, the groups of diffractive segments or pixels 300, 400 of the second and third diffractive relief structures 30, 40 responsive to green and blue light respectively, transform the beams 15, 16 of substantially collimated light from the green and blue light sources 150, 160 into second and third patterned beams 18, 19 of green and blue light respectively. These patterned beams produce second and third partial images 180, 190 in the reconstruction plane 100.

As a result of the interlaced arrangement of the first, second and third diffractive relief structures 20, 30 and 40 in the diffractive device 11, the first, second and third partial images 170, 180 and 190 overlap in the reconstruction plane to produce a multicolored image 110.

In a particularly preferred embodiment, the illumination means 13 is provided with switching means for switching each of the red, green and blue light sources 140, 150 and 160 on and off. The switching means is preferably controlled by a controller in such a manner that the on/off switching of the light sources takes place sequentially or cyclically, more preferably at a predetermined frequency and phase shift. The frequency period at which the sequential or cyclic switching takes place is preferably selected so that it is shorter than the residual image retention period of the human eye. The predetermined frequency is preferably at least 12 Hz, more preferably 24 Hz or higher. When an observer views the projected image produced in the reconstruction plane 100, e.g. by placing his eye in the reconstruction plane 100 or by viewing a screen placed in the reconstruction plane 100, the observer sees a truly multicolored image 110 rather than three separate colored partial images. The multicolored image 100 produced in this manner does not suffer severely from chromatic distortion and makes the image more recognisable to the observer, thereby improving its use in authenticating the security document. In some embodiments, the security document may have another version of the multicolored image printed or otherwise provided at another location on the document to form a reference image for comparison with the virtual multicolored image in the reconstruction plane. Alternatively, the reference image may be provided on a separate component.

Figure 3:
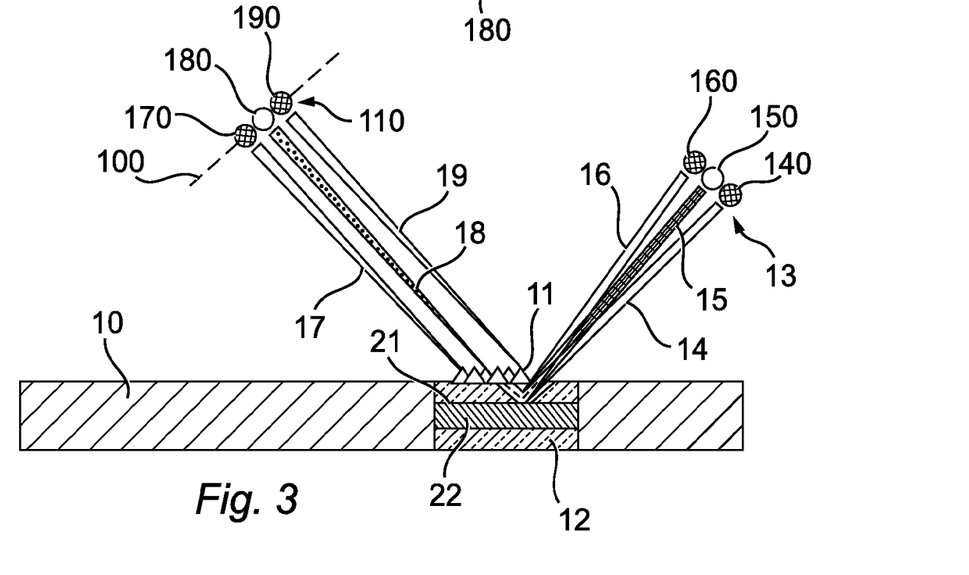
FIG. 3 is a schematic sectional view through a security document incorporating a reflective diffractive security device in accordance with the invention and showing a method of viewing and authenticating the security device.

FIG. 3 shows a schematic sectional view of a security document 10 which includes a diffractive device or DOE 11 which is designed to operate in reflection using similar apparatus to that of FIG. 2. In FIG. 3, parts of the security document and parts of the apparatus correspond to similar parts in FIG. 2 and corresponding reference numerals have been used.

The diffractive device or DOE 11 in FIG. 3 is also disposed in a substantially transparent area or window 12 of the document 10. The DOE 11 is actually constructed as a transmissive DOE, but operates in reflection because a reflective layer 22 is provided in the window 12 beneath the DOE 11 and spaced a short distance away from the DOE 11.

In use, the DOE 11 of FIG. 3 is illuminated by illumination means 13 arranged to produce three beams 14, 15 and 16 of substantially collimated light of three different wavelengths, e.g. red, green and blue. Again, the illumination means may comprise LED's 140, 150 and 160, or lasers of appropriate frequencies in the red, green and blue parts of the visible spectrum.

The three beams 14, 15 and 16 are directed at an angle onto the reflective layer 22 in the window area 12 at a position adjacent to the DOE 11 so that each beam 14, 15, 16 is reflected back off the reflective layer 22 onto the DOE 11. The beams 14, 15 and 16 of substantially collimated monochromatic light are transformed by the groups of diffractive segments or pixels 200, 300 and 400 of the first, second and third diffractive relief structures 20, 30 and 40 of the DOE 11 into patterned beams 17, 18 and 19 of different color, e.g. red, green and blue respectively, in similar manner to the DOE 11 of FIG. 2. It will be apparent from FIG. 3 that the main difference in operation from FIG. 2 is that the three beams 17, 18 and 19 are emitted from the DOE 11 on the same side of the security document 10 as the illumination means 13. Consequently, the reconstruction plane 100 in which the three colored partial images 170, 180, 190 form the multicolored image 110 is also on the same side of the security document as the illumination means 13.

In a modified embodiment (not shown), the transmissive DOE 11 and reflective layer 22 in FIG. 3 may be replaced by a reflective diffractive device or DOE, the upper or outward surface of which is directly illuminated by the three beams of monochromatic light 14, 15 and 16 from the illumination means 13. Such a reflective DOE may be formed by providing an appropriate diffractive surface relief structure in a reflective layer, such as a metallic layer or layer of high refractive index. In this case, it is not necessary for the reflective DOE to be provided in a transparent area or window of the security document. Instead, the reflective DOE could be provided on an opaque surface of a security document.

As in the embodiment of FIG. 2, the illumination means 13 in FIG. 3 may also include switching means (not shown) for each of the red, green and blue sources 140, 150, 160. Again, the switching means may be controlled by a controller in such a manner that on/off switching of the light sources 140, 150, 160 takes place sequentially or cyclically. Thus the optical effect seen by an observer in the reconstruction plane 100 in the embodiment of FIG. 3 is the same as in FIG. 2.

Figure 4:
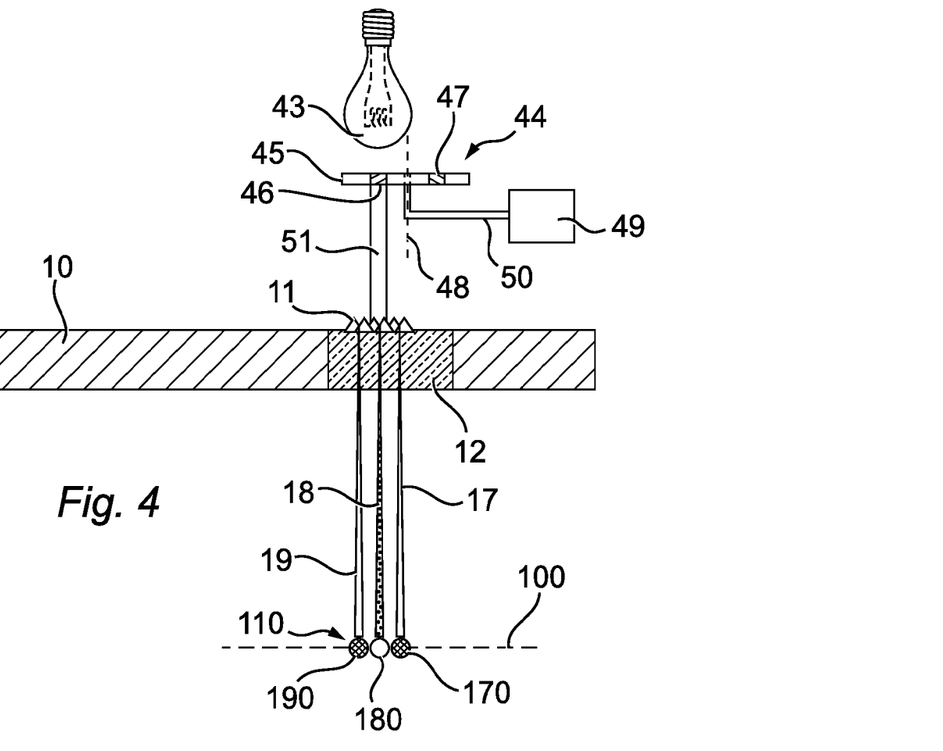
FIG. 4 is a schematic sectional view through a security document incorporating a transmissive diffractive security device in accordance with the invention and showing another method of viewing and authenticating the security device.
Figure 5:
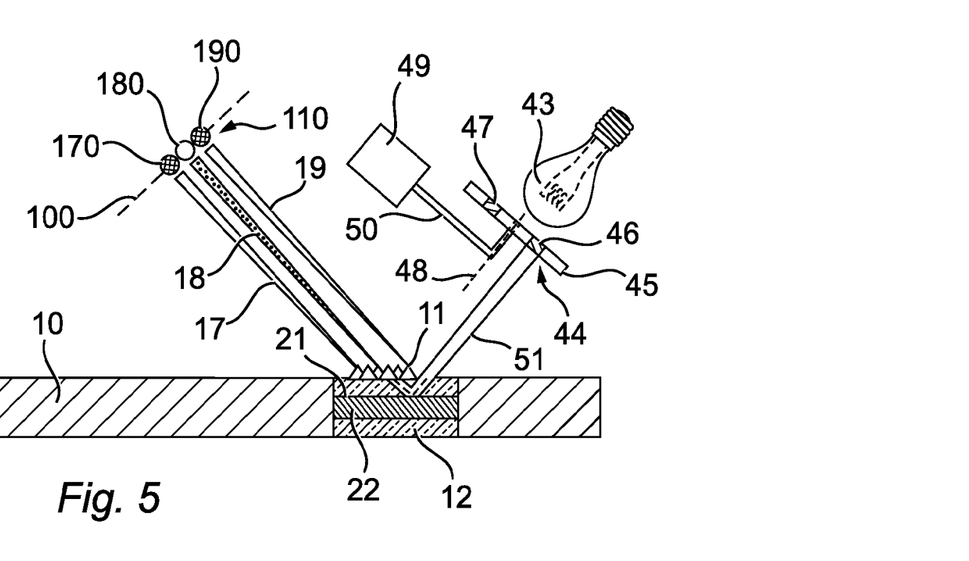
FIG. 5 is a schematic sectional view through a security document incorporating a reflective diffractive security device in accordance with the invention and showing another method of viewing and authenticating the security device.

FIGS. 4 and 5 show an alternative method and apparatus for illuminating diffractive security devices in accordance with the invention. FIG. 4 shows a security document 10 identical to that of FIG. 2 and corresponding reference numerals have been applied to corresponding parts. Thus the security document 10 includes a transmissive diffractive device or DOE 11 disposed in a substantially transparent area or window 12 of the document.

FIG. 4 differs from FIG. 2 in that the illumination means 13 of FIG. 2 has been replaced by a polychromatic light source 43 and filter means 44. The polychromatic light source 43 is represented in FIG. 3 by a tungsten filament light globe which produces white light. The filter means 44 preferably includes three different optical filters which, when placed in front of the polychromatic light source 43, produce patterned monochromatic beams of light 17, 18, 19 of first, second and third wavelengths of different colors, preferably red, green and blue. The filter means preferably includes switching means for switching between the filters in a sequential or cyclical manner.

As illustrated schematically in FIG. 4, the switching means 44 is in the form of a rotatable filter wheel 45. The filter wheel 45 has three different color filters of the three different colors, red, green and blue, spaced at different locations around the axis of rotation of the filter wheel 45. For the sake of convenience, only two of the three colored filters 46 and 47 are shown in the cross-sectional view of the filter wheel 45 of FIG. 4.

The filter wheel 45 is adapted to be rotated about its axis of rotation 48 by a drive motor 49 and drive train 50. In operation, as the filter wheel 45 rotates, each of the three colored filters (46, 47) passes in front of the polychromatic light source 43 in turn to produce three monochromatic beams of light 51 of the three different colors, red, green and blue sequentially, each beam 51 being directed onto the diffractive device or DOE 11 in the window 12 of the security document.

In one embodiment, the size of each of the colored filters 46, 47 is preferably small enough to simulate a point light source so that each beam 51 of monochromatic light is substantially collimated. This embodiment is particularly suitable for the case when the polychromatic light source is not a point light source and does not produce substantially collimated light, e.g. an incandescent light bulb or globe.

In another embodiment, the polychromatic light source 43 may be a point light source or pseudo point light source of white light, or other white light source which produces a substantially collimated beam of light directed onto the filter wheel 45. In this case, the size of the colored filters is less important.

In operation, the embodiment of FIG. 4 functions in similar manner to that of FIG. 2 when the illumination means 13 is provided with switching means for switching the red, green and blue light sources 140, 150, 160 on and off sequentially or cyclically. The rotating filter wheel 45 functions as a switching filter so that the color of the beam 51 directed onto the diffractive device 11 switches sequentially between the three different colors, red, green and blue as the filter wheel 45 rotates. Thus the embodiment of FIG. 4 also relies upon residual image retention of the human eye, and the frequency at which the filter wheel 45 is rotated is preferably selected accordingly. The predetermined frequency of rotation is preferably at least 12 Hz, and more preferably 24 Hz or higher.

The projected image 110 in the reconstruction plane 100 will therefore consist of successive partial images 170, 180, 190 in the three different colors created by the successive transmitted beams 17, 18, 19, but the frequency at which the partial images 170, 180, 190 change will produce the effect of a multicolored image owing to the residual image retention of the human eye.

FIG. 5 shows a schematic sectional view of a security document 10 which is identical to the security document of FIG. 3 and corresponding reference numerals are applied to corresponding parts. FIG. 5 differs from FIG. 3 in that the apparatus for illuminating the diffractive device 11 and for viewing the resulting image is substantially the same as illustrated in and described with reference to FIG. 4. Corresponding reference numerals for the apparatus in FIG. 4 are used in FIG. 5.

The diffractive device 11 or DOE in FIG. 5 operates in reflection. When the filter wheel 45 rotates in front of the polychromatic white light source 43, the beam 51 directed onto the window 12 of the document at a position adjacent to the diffractive device or DOE will change sequentially between the three different colors of the optical filters 46, 47 of the filter wheel. This will result in successive monochromatic patterned beams 17, 18, 19 in the three different colors being produced in sequence as the beam 51 is reflected back off the reflective layer 22 through the DOE 11. Each patterned beam 17, 18, 19 produces, in turn, a projected partial image 170, 180, 190 of a different color in the reconstruction plane 100. Again, as in FIG. 4, the frequency of rotation of the filter wheel 45 is arranged such that the observer will see a multicolored image 110 formed by the three overlapping partial images 170, 180, 190 through the effect of residual image retention of the human eye.

A preferred method of manufacture of a diffractive device in accordance with the invention will now be described.

Original artwork in the form of a multicolored input image corresponding to the required multicolored output image produced by the final diffractive device is first of all broken down into red, green and blue (RGB) partial images from the original colored image, using standard reprographic techniques used to create multicolored tonal images in the printing industry.

For each of these three partial images, a Fourier transform is performed and used to construct a three dimensional phase structure for a diffractive optical element (DOE) corresponding to each partial image using known techniques (ref Digital Diffractive Optics, Author Bernard Kress and Patrick Meyrueis, Wiley, ISBN ref 0471984477).

A sequence of tiles is produced for each DOE, and these are interlaced with one another in a repeating pattern at a tile size larger than the spot size of the light source used to illuminate the structure.

These structures are then reproduced to create a master metallic shim in a manner commonly used in the production of surface relief diffractive structures such as holograms (Diffractive Optically Variable Devices (DOVD's)).

This master shim is then replicated in to a production shim by recombining it several times in positions on the shim relevant to the final desired position on the finished security document. Again this process is well documented and is known to those skilled in the art.

The diffractive structures are then replicated on the security document using an embossing process, such as hot embossing, or embossing into a UV curable ink.

In order to prevent these structures from being easily replicated then it is advisable that they be covered with a layer having a high enough refractive index so that the device can then be fully embedded in a covering polymer layer. This can be done in a two step process in which the high refractive layer is first applied and then a second, thicker layer is applied so as to totally embed the structures. Alternatively the same result can be achieved in one step by using an embedding process of applying a polymer layer with intrinsic high refractive index properties or a polymer metal oxide composite layer in the same manner.

Alternatively the shims can be used to create a hot stamping foil in which case the device is transferred as a result of a hot stamping process. In this instance the hot stamping foil structure is preferably covered with a high refractive index material as the image is to be viewed in transmission. A suitable material for this would be Zinc Sulphide, which may be applied by vacuum deposition. Alternatively, a coating having a high refractive index, for example based upon polymeric materials including nano-scale metal oxide particles or high refractive index polymers, may be applied.

Figure 6:
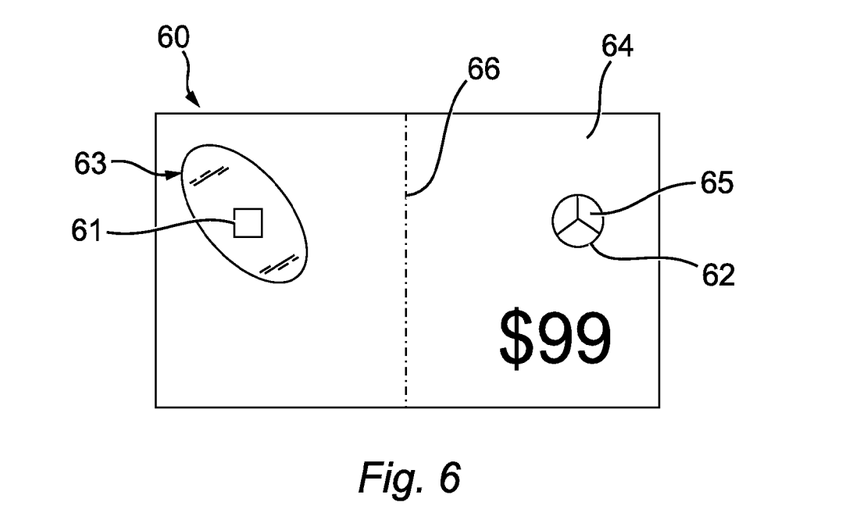
FIG. 6 is a schematic plan view of a self-verifying security document incorporating a diffractive security device and a verification element for viewing and authenticating the security device.
Figure 7:
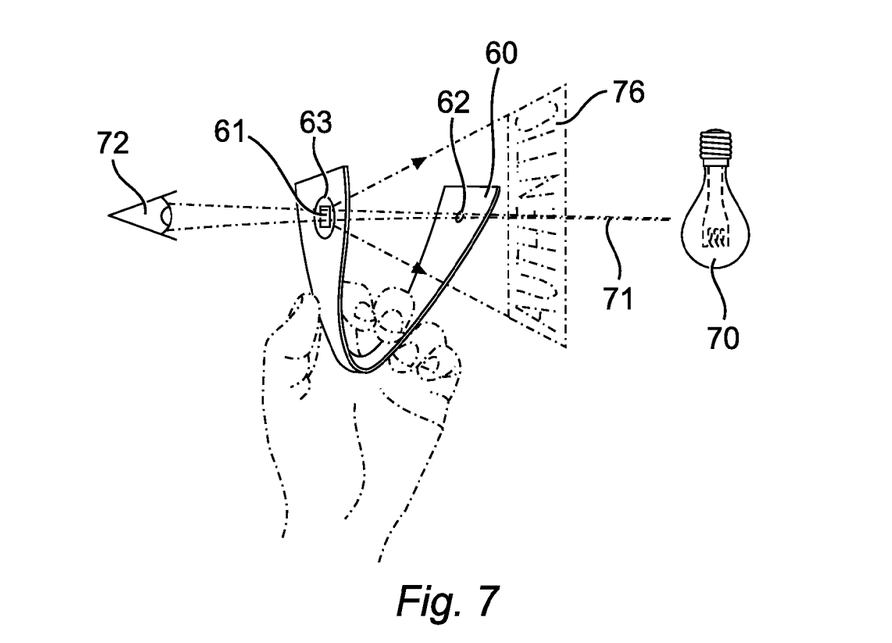
FIG. 7 is a view of the self-verifying security document of FIG. 6 in use.

FIGS. 6 and 7 show a self-verifying security document 60 incorporating a diffractive device or DOE 61 in a first window 63 of the document and a verification element 62 in a second window 64 at a laterally spaced location of the document. The security document 60 is in the form of a single flexible sheet, such as a banknote.

The diffractive element or DOE 61 has a plurality of diffractive segments or pixels each responsive to light of a different wavelength as described above.

The verification element 62 in the second window has a plurality of optical filter segments 65, preferably three, each of which is arranged to produce light of a different wavelength when illuminated by a polychromatic light source 70.

FIG. 7 shows the self-verifying security document of FIG. 6 in use with the security document bent about a fold line 66 so that the polychromatic light source 70, the verification element 62, the DOE 61 and the eye 72 of an observer 74 are all in line. Polychromatic light 71 from source 70 passing through the verification element 62 is converted by the optical filter segments 65 into separate beams of substantially collimated monochromatic light of different wavelengths. These beams are directed onto the DOE 61 and are transformed by the DOE into patterned beams that overlap and have the effect at the observer's eye 72 of producing a multicolored virtual image 76 corresponding to the multicolored image stored in the pixels of the DOE.

The optical filter segments 65 may be color filters, such as color filters formed by printing different colored inks on the verification window 62. Alternatively, they may be formed as interference filters or holographic filters.

It will be appreciated from the foregoing that the invention not only provides a new type of diffractive security device which can produce a multicolored image that is difficult to counterfeit, but also a method and apparatus for viewing and inspecting the security device, and a method of manufacture that is difficult for the average counterfeiter to reproduce.

The invention claimed is:

1. A method of viewing or authenticating a diffractive device the method comprising the steps of:
providing a diffractive device having a first diffractive relief structure responsive to a first wavelength of visible monochromatic light, a second diffractive relief structure responsive to a second wavelength of visible monochromatic light, and a third diffractive relief structure responsive to a third wavelength of visible monochromatic light;
illuminating the diffractive device with a first beam of visible monochromatic light of the first wavelength to produce a first partial image of a first color in a reconstruction plane,
illuminating the diffractive device with a second beam of visible monochromatic light of the second wavelength to produce a second partial image of a second color in the reconstruction plane, and
illuminating the diffractive device with a third beam of visible monochromatic light of the third wavelength to produce a third partial image of a third color in a reconstruction plane, wherein:
the first, second and third diffractive relief structures are each numerical-type diffractive optical elements (DOEs) comprising first, second, and third groups of interlaced pixels, respectively, such that the first, second, and third diffractive relief structures are at least partially interlaced relative to one another,
the first, second and third partial images at least partially overlap in the reconstruction plane to form a multicolored image, and
the first, second and third colors of the partial images correspond to three colors of a multicolored input image.

2. A method according to claim 1, wherein the illumination steps are performed at least one of simultaneously, in sequence, or cyclically.

3. A method according to claim 1, wherein the illumination steps are performed at a frequency of 24 Hz or greater.

4. A method according to claim 1, wherein at least one of the three colours colors are at least one of primary or secondary colors; or the complete multicolored image is formed by additive colors.

5. A method according to claim 1, wherein the colors are projected such that they fall in a separate projection space to create the range of colors in the multicolored image by half toning.

6. A method according to claim 1, further comprising the step of comparing the multicolored image to a reference image to authenticate the diffractive device.

7. A diffractive security device, including a transparent substrate, said device comprising:
a first diffractive relief structure provided at least one of in or on the transparent substrate and responsive to a first wavelength of visible light,
a second diffractive relief structure at least one of in or on the transparent substrate and responsive to a second wavelength of visible light,
a third diffractive relief structure at least one of in or on the transparent substrate and responsive to a third wavelength of visible light, wherein
under illumination, the first diffractive relief structure produces a first partial image of a first color in a reconstruction plane, the second diffractive relief structure produces a second partial image of a second color in the reconstruction plane and the third diffractive relief structure produces a third partial image of a third color in the reconstruction plane,
the first, second and third diffractive relief structures are each numerical-type diffractive optical elements (DOEs) comprising first, second, and third groups of interlaced pixels, respectively, such that the first, second, and third diffractive relief structures are at least partially interlaced relative to one another,
the first, second and third colors of the partial images correspond to three colors of a multicolored input image, and
the first, second and third partial images at least partially overlap in the reconstruction plane to form a multicolored image.

8. A diffractive security device according to claim 7, wherein the first, second and third diffractive relief structures are responsive to wavelengths of at least one of primary or secondary colors.

9. A diffractive security device according to claim 7, wherein the first, second and third relief structures are modulated, by modulating the heights or depths of the first, second and third relief structures, to produce variations in intensity in the reconstruction plane which correspond to variations in brightness levels of a tonal colored input image.

10. A diffractive security device according to claim 7, including further relief structures responsive to the first, second and third wavelengths, the further relief structures producing further partial images in at least one additional reconstruction plane, the further partial images at least partially overlapping to produce a further multicolored image in the at least one additional reconstruction plane.

11. A diffractive security device according to claim 7, wherein each relief structure includes a plurality of diffractive segments, the diffractive segments being interlaced with diffractive segments of the other relief structures.

12. A security device according to claim 7, wherein the security device is a transmissive security device adapted to be viewed in transmission.

13. A security device according to claim 7, further including a reflective layer of at least one of a metallic or high-refractive index material.

14. A security document such as a banknote, including the security device of claim 7, wherein the security device is applied on or in a window or half-window region of the security document.

15. Apparatus for viewing or authenticating a diffractive device, said apparatus comprising;
  a first diffractive relief structure responsive to a first wavelength of visible monochromatic light,
  a second diffractive relief structure responsive to a second wavelength of visible monochromatic light, and
  a third diffractive relief structure responsive to a third wavelength of visible monochromatic light wherein:
  the apparatus includes illumination means for producing three separate beams of visible monochromatic light of the first, second and third wavelengths,
  the first, second and third diffractive relief structures are each numerical-type diffractive optical elements (DOEs) comprising first, second, and third groups of interlaced pixels, respectively, such that the first, second, and third diffractive relief structures are at least partially interlaced relative to one another,
  the first beam of visible monochromatic light of the first wavelength is directed onto the diffractive device to produce a first partial image of a first color in a reconstruction plane, the second beam of visible monochromatic light of the second wavelength is directed onto the diffractive device to produce a second partial image of a second color in a reconstruction plane, and a third beam of visible monochromatic light of the third wavelength is directed onto the diffractive device to produce a third partial image of a third color in a reconstruction plane, and wherein the first, second and third colors of the partial images correspond to three colors of a multicolored input image, and
  the first, second and third partial images at least partially overlap in the reconstruction plane to form a multicolored image.

16. Apparatus according to claim 15, wherein the illumination means includes three different sources of visible monochromatic light of each of the first, second and third wavelengths.

17. Apparatus according to claim 15, wherein the illumination means includes a polychromatic light source and optical filters for producing the first, second and third wavelengths arranged to produce three separate beams of monochromatic light of the first, second and third wavelengths when illuminated by the polychromatic light source.

18. Apparatus according to claim 15 further including switching means for switching between first, second and third wavelengths.

19. Apparatus according to claim 15, further including at least one of a screen or a detector positioned at least one of at or near the reconstruction plane, and/or including comparison means for comparing the multicolored image to a reference image to authenticate the diffractive device.

* * * * *